United States Patent [19]
Sueta et al.

[11] Patent Number: 4,746,394
[45] Date of Patent: May 24, 1988

[54] PAPER PUNCH WITH PUNCHED-HOLE REINFORCING PIECE STICKING MECHANISM

[75] Inventors: Norio Sueta, Chiba; Hiroyasu Hoshino, Tokyo, both of Japan

[73] Assignee: Elm Industry Co., Ltd., Tokyo, Japan

[21] Appl. No.: 933,216

[22] Filed: Nov. 21, 1986

[30] Foreign Application Priority Data

Jan. 11, 1986 [JP] Japan .................................... 61-3984

[51] Int. Cl.[4] ........................ B32B 31/04; B32B 31/18
[52] U.S. Cl. ...................................... 156/513; 156/514
[58] Field of Search ............... 156/513, 514, 530, 540, 156/541

[56] References Cited

U.S. PATENT DOCUMENTS

| | | | |
|---|---|---|---|
| 2,228,372 | 1/1941 | Stuhlinger | 156/513 |
| 2,437,022 | 3/1948 | Fritzinger | 156/513 |
| 2,486,471 | 11/1949 | Fritzinger | 156/513 |
| 3,289,509 | 12/1966 | Cahill | 156/513 |
| 3,441,462 | 4/1969 | Bogen et al. | 156/513 |
| 4,077,554 | 2/1978 | McKibben | 156/514 |

*Primary Examiner*—Caleb Weston
*Attorney, Agent, or Firm*—Oblon, Fisher Spivak, McClelland & Maier

[57] ABSTRACT

A paper punch sends out a tape carrying a number of punched-hole reinforcing pieces by the length of a single reinforcing piece interlockingly with the motion of a handle that raises and lowers a punching rod, sticking the reinforcing piece in the desired position of a sheet of paper placed on a base and, then, cutting a binding hole through the paper and reinforcing piece stuck thereon. The improvement is such that an insertion hole is provided in the handle to loosely pass through a horizontal pin that is attached to the punching rod so that the punching rod is kept from descending to perform a punching operation while the carrying tape is let out by the length of a single reinforcing piece in the early stage of the descending stroke of the handle. A pressing mechanism is provided so that the reinforcing piece supplied from the carrying tape into the desired position on the paper is firmly pressed against the paper before the punching rod cuts a hole therethrough. Accordingly, a binding hole is cut in the desired position of the paper and reinforcing piece after the reinforcing piece has been securely stuck in the desired position of the paper.

13 Claims, 7 Drawing Sheets

PAPER PUNCH WITH PUNCHED-HOLE REINFORCING PIECE STICKING MECHANISM

BACKGROUND OF THE INVENTION

1. Field of the Invention

This invention relates to a paper punch for cutting holes along one edge of a sheet or sheets of paper to be bound in a loose-leaf notebook or the like, and more particularly to an improvement in a paper punch having a mechanism to stick a piece to reinforce the peripheral edge of a punched hole in the desired position on the paper immediately before perforation and then punch a hole through the paper and stuck reinforcing piece.

2. Description of the Prior Art

A hole or a series of holes cut along one edge of paper to permit the paper to be bound in a loose-leaf notebook or other similar binding covers have a drawback of getting easily torn. To reinforce such readily tearable holes, several paper punches of the known type have a mechanism to stick a thin refinforcing piece of plastic or other material around each hole, cutting a hole thereafter through the paper and reinforcing piece.

Some of known paper punches incorporate a cassette containing a reeled tape on which such reinforcing-pieces are stuck. Each time paper is punched, the tape is automatically let out from the cassette to allow a reinforcing-piece to be stuck around a perforated hole.

However, sticking reinforcing-pieces on paper with such conventional techniques has been neither easy nor efficient. It has been difficult to cut a hole in the desired position of paper and a reinforcing-piece stuck thereon. In other words, it has been difficult to achieve appropriate sticking of reinforcing-pieces without some experience or skill.

OBJECTS OF THE INVENTION

In a paper punch for cutting holes along one edge of paper to be bound in a losoe-leaf notebook or the like equipped with a mechanism to stick a piece to reinforce the peripheral edge of a punched hole in the desired position on the paper immediately before perforation and punch a hole thereafter through the paper and stuck reinforcing-piece, an object of this invention is to provide a paper punch that is capable of surely sticking a reinforcing piece in the desired position on paper and then cutting a hole in the desired position through the paper and reinforcing piece stuck thereon.

Another object of this invention is to provide simple means whereby the punching rod of a paper punch is kept from descending to perform a punching operation while a carrying-tape is being let out by the length of one reinforcing-piece in the initial stage of a motion by which the handle attached to the punching rod is actuated.

Still another object of this invention is to provide a paper punch that is equipped with a pressing mechanism adapted to press onto paper a reinforcing-piece supplied into the desired position thereon so that steady and stable perforation by the punching rod can be achieved.

Yet another object of this invention is to provide a paper punch that is equipped with a paper holding mechanism adapted to hold paper outside the reinforcing-piece sticking position so that steady and stable performation by the punching rod can be achieved.

A further object of this invention is to provide a paper punch whereby the on-off switching of the handle-operated feed of reinforcing-pieces can be achieved by a simple manipulaton of an operating plate.

Another object of this invention is to provide a paper punch adapted to hold a carrying-tape containing cassette of the type that a resilient element having a small projection adapted to engage with a small hole in the carrying-tape is provided in the clearance at the extended end of the cassette through which the carrying-tape is fed out, whereby the carrying-tape is kept from being let out unless necessary when the cassette is not contained in the paper punch, thereby ensuring that the reinforcing-pieces are steadily and precisely fed out only when the cassette is set in the paper punch.

Still another object of this invention is to provide a paper punch equipped with a punching rod cleaning mechanism that is adapted to prevent the buildup of an adhesive that might transfer from the reinforcing-pieces to the surface of the punching rod, thereby ensuring that smooth motion of the punching rod is uninterrupted.

SUMMARY OF THE INVENTION

A paper punch according to this invention has a mechanism that lets out a carrying-tape, which carries a large number of pieces to reinforce punched holes in paper, by the length of one reinforcing-piece interlockingly with the motion of a handle for raising and lowering a punching rod, sticks the supplied reinforcing-piece in the desired position of paper on a base, and then cuts a hole through the paper and stuck reinforcing-piece. The feature of this invention is that the above paper punch is equipped with means whereby the punching rod is kept from descending to perform a punching operation while the carrying-tape is being let out by the length of one reinforcing-piece in the initial stage of a motion by which the handle attached to the punching rod is actuated, and also with a pressing mechanism adapted to press a reinforcing-piece supplied into the desired position onto paper immediately before the punching rod cuts a hole in the paper.

The objects, constructions and effects of this invention, both described and not described so far, will be made clear through the following detailed description of preferred embodiments thereof that is to be read by reference to the accompanying drawings. The embodiments described hereunder are examples of preferable ones, and it goes without saying that this invention is by no means limited thereto.

DESCRIPTION OF THE PREFERRED EMBODIMENTS

Figure 1:
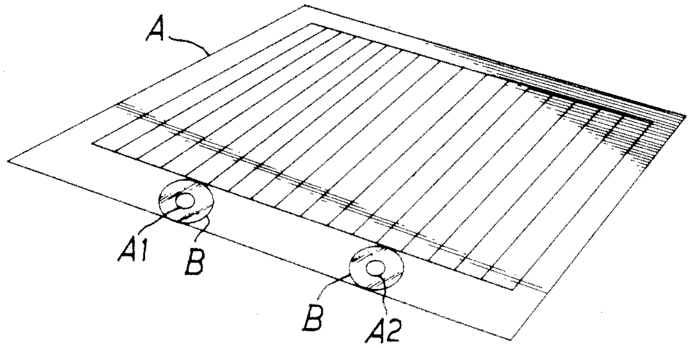
FIG. 1 is a perspective view of a sheet of paper on which hole-reinforcing pieces are stuck.

FIG. 1 shows a sheet of paper A having a pair of binding holes $A_1$, $A_2$ punched along one edge thereof, with pieces B, B to reinforce the peripheral edge of the holes stuck therearound. The binding holes $A_1$, $A_2$ are punched through the reinforcing-pieces B, B, as well. This invention is applied not only to the punching of paired holes $A_1$, $A_2$, but also to the punching of a single hole or holes numbering three, four or even more.

Figure 2:
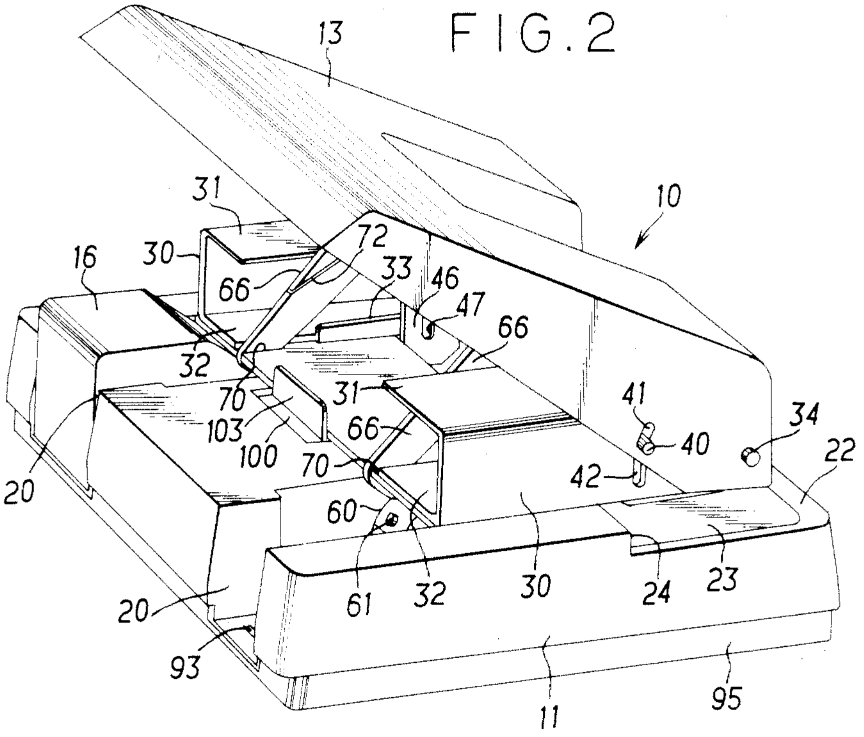
FIG. 2 is a perspective view of a paper punch, with a cassette at one end removed.

FIG. 2 shows a paper punch 10 that is capable of punching the pairs holes $A_1$, $A_2$ at a time by a single motion of a handle. The paper punch 10 is engineered to stick the reinforcing pieces B, B in the desired position of the paper A immediately before the holes $A_1$, $A_2$ are punched and then cut holes through the paper A and reinforcing pieces B that are pressed thereon.

To be more concrete, the paper punch 10 essentially comprises, as is shown in FIGS. 2 and 6 to 8, a base 11, a punching mechanism 12 that cuts binding holes in paper A with a punching rod 14 depressed by the motion of a handle 13 mounted on the base 11, a reinforcing-piece sticking mechanism that sends out a holding tape C carrying a number of reinforcing pieces B from a cassette 16 interlockingly with the motion of the handle 13 and sticks a reinforcing piece B in the desired position on the paper A, and a pressing mechanism 17 that presses the appropriately positioned reinforcing piece B onto the paper A before the punching rod 14 cuts a hole therethrough.

Figure 6:
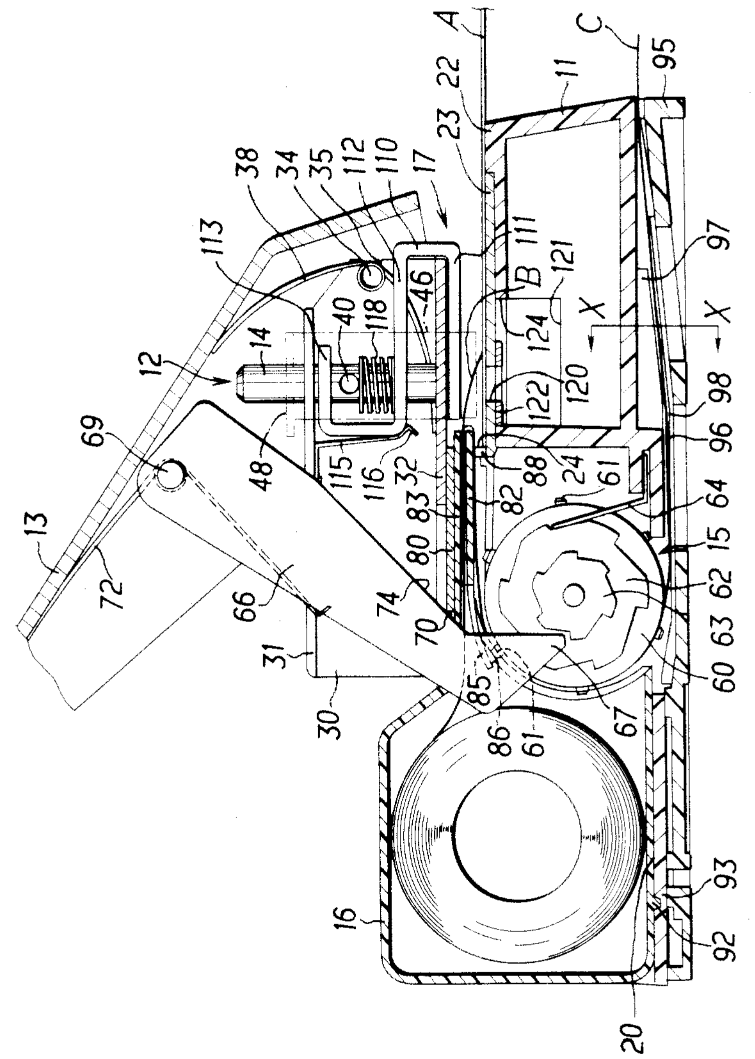
FIG. 6 is a cross-sectional side view of a paper punch feeding out a reinforcing-piece.

As is clearly shown in FIGS. 2 and 6, the base 11 of plastic is formed into such a shape as to provide a recess 20 to accommodate a cassette 16 at each end of the rear half thereof. A metal sheet 23 is placed on a down-stepped portion 22 in the front half. In the middle of the base 11, the metal sheet 23 is raised by a short vertical portion 24. The metal sheet 23 is of such a size as is large enough to cover substantially the whole area of the down-stepped portion 22 in the front half of the base 11 and the top surface of the raised portion in the middle thereof. A sheet of paper A to be punched with binding holes $A_1$, $A_2$ is placed on the down-stepped portion 22. To ensure that the top surface of the metal sheet 23 is flush with the top surface of the rest of the base 11, a shallow depression, in which the metal sheet 23 is to be buried, is provided in the top surface of the base 11. The metal sheet 23 fitted in the shallow depression is fastened to the base 11 by means of bolts fastened at appropriate points.

On both sides of the metal sheet 23 on the raised middle portion of the base 11 are fastened substantially channel-shaped supports 30, 30, with the open end of the channels directed inward. Part of each support 30 extends from the raised middle portion to above the down-stepped portion 22 in the front half of the base 11, with a clearance left between the bottom surface of the support 30 and the top surface of the down-stepped portion 22, as shown in FIG. 6. The paper A in which the binding holes $A_1$, $A_2$ are to be punched is inserted in the clearance just mentioned. The depth of insertion is limited by the vertical portion 24 where the metal sheet 23 is bent between the down-stepped portion in the front half and the middle portion.

Figure 8:
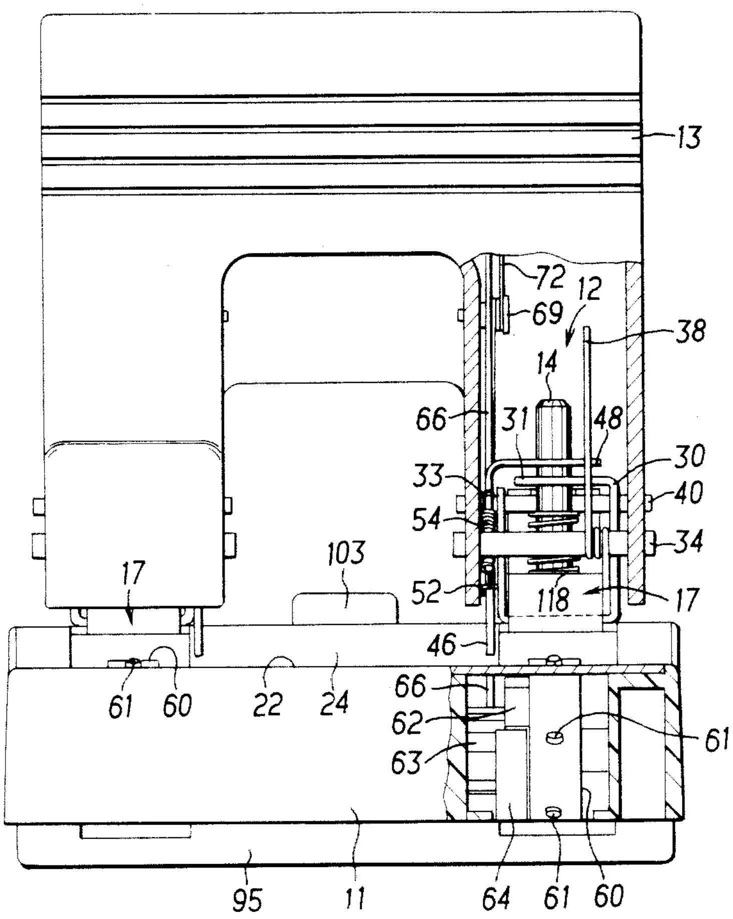
FIG. 8 is a front view of the same paper punch, with a part thereof cut open.

The width of the handle 13 is somewhat smaller than that of the base 11 as shown in FIG. 8. The middle portion in the lower half of the handle 13 is hollowed out, while both edges are left unremoved to provide a support for the punching rod 14 and other members. The position of the paper A placed on the down-stepped portion 22 of the base 11 can be easily checked through the hollowed opening.

Figure 9:
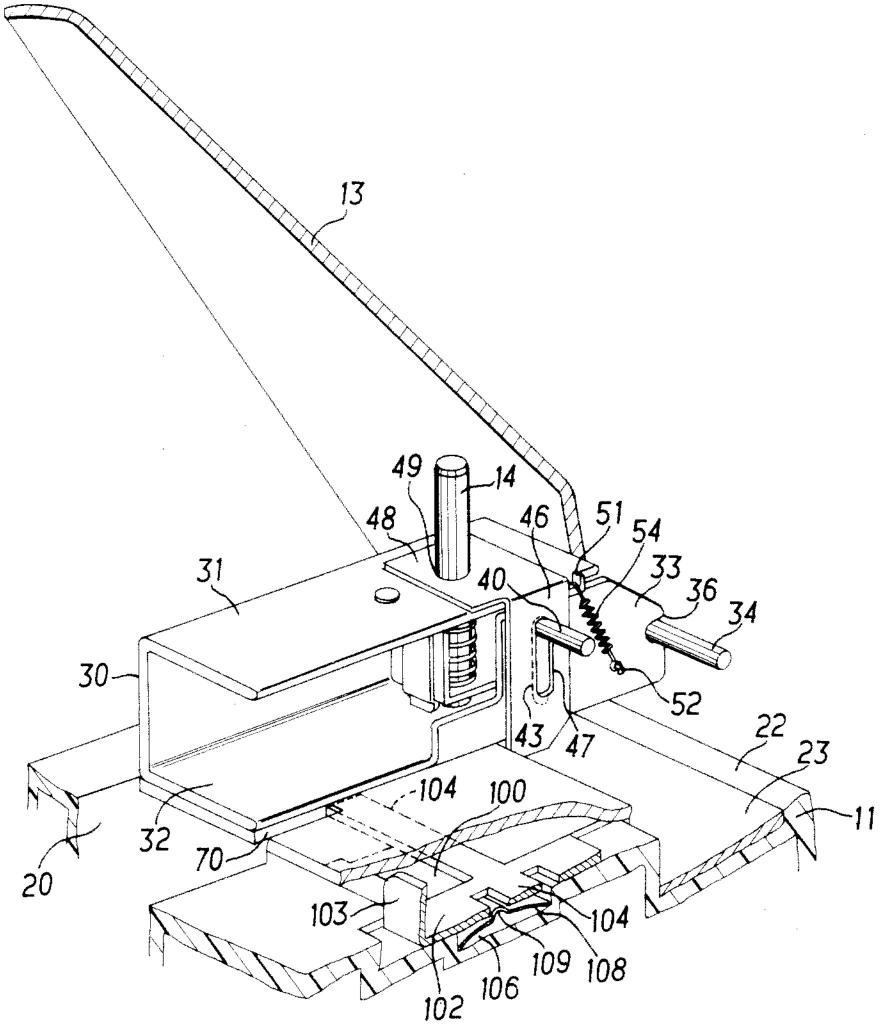
FIG. 9 is a partial perspective view of the same paper punch.

The lower half of the handle is channel-shaped in cross section in such a manner that the upper side 31 of the channel-shaped support 30 is loosely contained therein. A horizontal spindle 34 passing through the lower end of the handle is fitted in a deep bearing recess 35 cut in the front end of each support 30 so that the free end of the handle 13 can be depressed about the spindle 34. To support the handle 13 firmly, an auxiliary support 33 is erected in the front part of the lower side 32 of each channel-shaped support 30 as shown in FIG. 9. A bearing recess 36 similar to the bearing recess 35 is cut in the auxiliary support 33 to support the spindle 34.

A spring 38 is coiled around the spindle 34 to keep the free end of the handle 13 raised away from the base 11. The two ends of the spring 38 are pressed against the lower side 32 of the channel-shaped supports 30 and against the inner surface of the handle 13, respectively.

A pin 40 to permit raising and lowering the punching rod 14 is horizontally passed therethrough and also through two insertion holes 41 in handle 13 are provided at a point away from where the handle 13 is supported by the spindle 34 and closer to the free end of the handle 13 as shown in FIG. 2. To vertically raise and lower the punching rod 14, the pin 40 too must be moved vertically. If the pin 40 is tightly passed through the handle 13, the handle 13 descends along a circular curve about the spindle 34 when depressed from the raised position. Therefore, the pin 40 is passed loosely through the handle 13. The pin 40 is also passed through vertically extending slots 42, 43 cut in one of the support 30 and in the opposite auxiliary supports 33 (as shown in FIGS. 2 and 9), respectively When the depressing force is released, the free end of the handle 13 is pushed up by the force of the spring 38. The upward movement of the handle 13 is stopped when the pin 40 comes in contact with the upper end of the slots 42, 43. The punching rod 14 is then raised to the uppermost position. FIGS. 2 and 6 show the punching rod 14 stopped in the uppermost position.

The punching mechanism 12 has a paper holding mechanism operated by the up-down motion of the pin 40 that actuates the punching rod 14. As shown in FIG. 9, the paper holding mechanism essentially comprises a paper-holding plate 46 disposed along the auxiliary support 33. The paper-holding plate 46 has a vertical slot 47 in the middle thereof, through which the pin 40 is passed. An upper bent portion 48 of the paper-holding plate 46 extends over the upper side 31 of one of the channel-shaped supports 30. The punching rod 14 passed through a hole 49 provided therien is allowed to move up and down along the outer surface of the auxiliary support 33. A tension spring 54 is interposed between a projection 51 on the paper-holding plate 46 and a check pin 52 provided on the lower portion of the auxiliary support 33, whereby the paper-holding plate 46 is constantly spring-urged downward. When the handle 13 is depressed, therefore, the paper-holding plate 46 immediately moves downward under the influence of the force exerted by the tension spring 54, thereby pressing the paper A placed on the metal sheet 23 thereagainst. After this, the pin 40 descends within the vertical slot 47 in the paper-holding plate 46. When the depressing force is released, the handle 13 returns upward. Provision is also made so that the pin 40 comes in contact with the upper end of the vertical slot 47 in the paper-holding plate 46 immediately before the pin 40 reaches the upper end of the slots 42, 43 in the associated support 30 and the auxiliary support 33. Accordingly, the lower end of the paper-holding plate 46 is positioned slightly above the metal sheet 23 when the handle 13 is in the uppermost position, leaving enough clearance to permit inserting the paper-holding A under the holding plate 46.

Pressed against the metal sheet 23 by the paper-holding plate 46 before being punched, the paper A is saved from undesirable disclocation and wrinkling that is likely to result from the sticking of a reinforcing piece B. This, in turn, permits sticking a reinforcing piece B exactly in the desired position on the paper A.

The following paragraphs describe a reinforcing-piece sticking mechanism 15 that lets out and sticks a reinforcing piece B to the desired position on the paper A.

A reinforcing-piece B is a circular sheet of moderately hard thin transparent plastic. By means of an adhesive substance coated on the under side thereof, a number of such reinforcing-pieces B are stuck at regular intervals on a holding tape C whose width is slightly larger than the diameter of the reinforcing-piece B. A small hole d is pierced through the center of each reinforcing-piece B and the holding tape C thereunder. Such a carrying-tape C carrying a number of reinforcing pieces B is coiled in a cassette 16 of the type shown in FIGS. 3, 4 and 5. As the carrying-tape C is let out interlockingly with the depression of the handle 13, a reinforcing-piece B automatically detached away from the tape C sticks to the desired position on the paper A.

As is obvious from FIGS. 2 and 6 to 8, a pair of tape feed rollers 60 to send out the carrying-tape C from the cassette 16 are rotatably supported in hollow spaces provided below the metal sheet 23 on both sides of the base 11. To send out the carrying-tape C from the cassette 16, each roller 60 is rotatable about a horizontal axis in line with the cassette 16, with regularly spaced small projections 61 being formed on the center line along the periphery of the roller 60. The intervals are such that the small projections 61 come in contact with the small holes d provided in the carrying-tape C and reinforcing-pieces B.

Each tape feed roller 60 has two ratchets 62, 63 of different diameters integrally formed on the inner side thereof. A plate spring 64 adapted to engage with a tooth on the larger ratchet 62 is provided to ensure that the ratchet 62 rotates only in one direction. The smaller ratchet 63 is driven by a catch 67 at the tip of a ratchet lever 66. The teeth on the two ratchets 62, 63 of different diameters are spaced away from each other in such a manner that the center angle formed between each two adjoining teeth is equal to that between the small projections 61 on the periphery of the roller 60. Besides, the teeth on the two ratchets 62, 63 are so interrelated to each other that the plate spring 64 becomes in engagement with a tooth on the larger ratchet 62 when the rotation of the smaller ratchet 63 driven by the catch 67 on the ratchet lever 66 comes to an end.

The ratchet level 66 that drives the smaller ratchet 63 on coming in engagement with a tooth thereon is rotatably connected to the handle 13 at the upper end via a pin 69 and inserted in grooves 70 cut in the rear edge of the metal sheet 23 in the middle thereof. Each groove 70 is cut in the rear edge of the metal sheet 23 above the recess 20 provided on the associated side of the base 11 to accommodate a cassette 16. The ratchet lever 66 inserted in the groove 70 is constantly urged toward the inside of the groove 70 by the force exerted by a spring 72 coiled around the pin 69.

When the handle 13 is depressed, the catch 67 at the tip of the ratchet lever 66 comes in engagement with a tooth on the smaller ratchet 63 to cause the smaller ratchet 63 to turn forward over a distance of a single tooth thereon. With this one-tooth length rotation of the smaller ratchet 63, an action to stick a reinforcing-piece B detached from the holding tape C onto paper A must be completed. To permit such an action, the inner pressing edge 74 on the lower side of the ratchet lever 66 urged by the spring 72 into the groove 70 cut in the rear edge of the metal sheet 23 is formed into such a cam surface that the catch 67 disengages itself from the smaller ratchet 63 when the smaller ratchet 63 has rotated over a predetermined angle.

Figure 3:
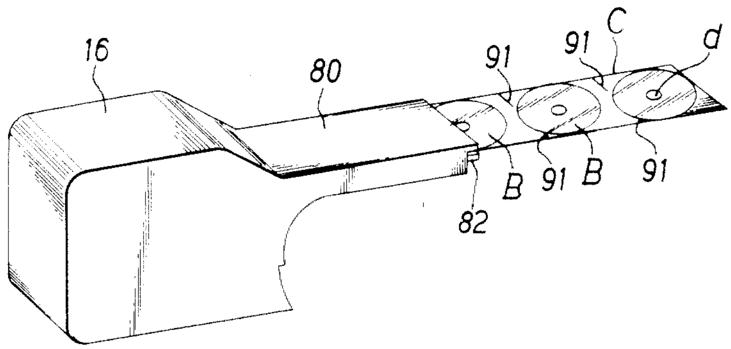
FIG. 3 is a perspective view showing a carrying-tape pulled out of a cassette.
Figure 4:
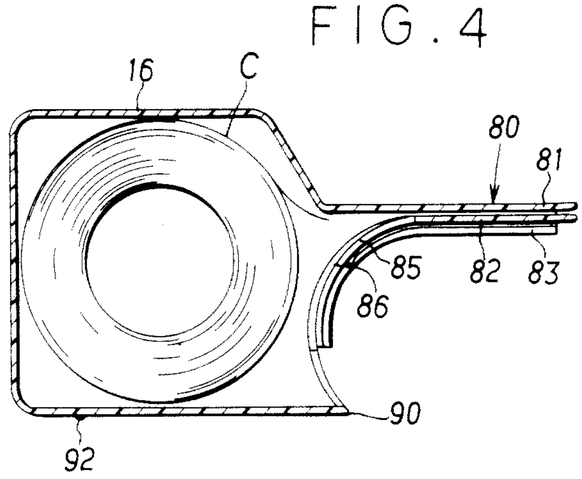
FIG. 4 is a cross-sectional side view of a cassette.
Figure 5:
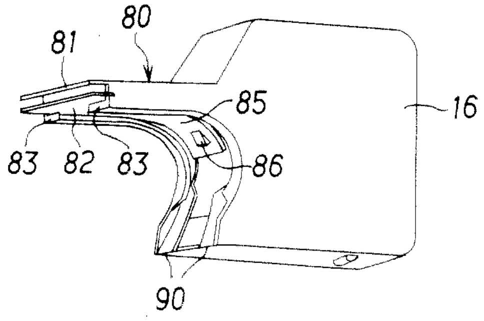
FIG. 5 is a perspective view of a cassette viewed from the other direction.

The cassette 16 containing a carrying-tape C carrying a number of regularly spaced reinforcing pieces B is made of thin plastic sheet as shown in FIGS. 3 to 5. To permit easy loading of the carrying-tape C, the cassette 16 is of such a design that a wall on one side thereof is readily detachable or the whole cassette is bisectable along the center axis thereof. The cassette 16 has a beak-like outlet 80 extended substantially in the middle of one side thereof, through which the carrying-tape C is sent out. The beak-like outlet 80 is made up of an upper wall 81, which is an extension of part of the enclosing walls of the cassette 16, an intermediate wall 82 extending substantially parallel to the upper wall 81 with a clearance just large enough to pass the carrying-tape C left therebetween, and engaging edges 83 extending on both sides of the beak-like outlet 80 substantially parallel to the intermediate wall 82 with a clearance just large enough to pass the carryingtape C left therebetween.

Both the intermediate wall 82 and the engaging edges 83 are circularly bend downward at a midway point thereof as shown in FIG. 4. The cassette 16 is set on the base 11 so that the bent portion of the beak-like outlet 80 faces the roller 60 on the base 11. The circularly bent portion of the intermediate wall 82 is narrowed down and cut midway to form a resilient tongue 85 whose width is approximately one-third the width of the intermediate wall 82 in the straight beak-like portion. A small projection 86 is provided on the outer surface of the tip of the resilient tongue 85. The small projection 86 resiliently protrudes into a passage formed between the intermediate wall 82 and the engaging edges 83.

As is obvious from FIG. 5, the engaging edges 83 project inwardly slightly from both sides of the beak-like outlet 80. The inwardly projecting edge portion of the intermediate wall 82 left uncut on each side of the resilient tongue 85 has a width substantially equal to the width of the engaging edges 83. Where the engaging edges 83 disappears toward the lower end of the intermediate wall 82, the width of the inwardly projecting edges of the intermediate wall 82 is reduced to such an extent as to permit the passage of the small projection 61 on the roller 60.

The leading end of the tape C carrying reinforcing-pieces B passed through the clearance between the upper wall 81 and the intermediate wall 82 is drawn out from the beak-like outlet 80 of the cassette 16 as shown in FIG. 3, bent downward at the exit end of the beak-like outlet 80, and then returned to the lower portion of the cassette 16 through the clearance between the intermediate wall 82 and engaging edges 83 and the subsequent curved portion thereof.

Because the tape C is thus sharply bent at the exit end of the beak-like outlet 80, a reinforcing-piece B carried thereon, which is made of a material somewhat harder and thinner than the tape C, spontaneously comes off from the tape C and is thrown onto the top of paper A from the tip of the beak-like outlet 80.

At the tip of the beak-like outlet 80, the forward end of the upper wall 81 and the intermediate wall 82 somewhat projects beyond the forward end of the engaging edges 83. When a cassette 16 is fitted in the base 11, the projected end juts out through a window 88 provided in the vertical portion 24 of the metal sheet 23 to hang over the edge of the paper A placed on the front half portion of the base 11. Consequently, the whole reinforcing-piece B discharged from the beak-like outlet 80 is securely placed on the paper A (see FIG. 6).

The carrying-tape C passed under the intermediate wall 82 is led through the clearance between the intermediate wall 82 and the engaging edges 83 and then wound around the roller 60. The tape C offers no problem so long as it is successively discharged outside. But if the tape C recedes again from the beak-like outlet 80, the intervals at which reinforcing-pieces B are fed out will be disturbed. To start the sticking operation immediately after the mounting of a cassette 16 on the base 11, small holes d in the tape C wound around the tape-feed roller 60 must be securely engaged with the small projections 61 provided therearound.

Figure 7:
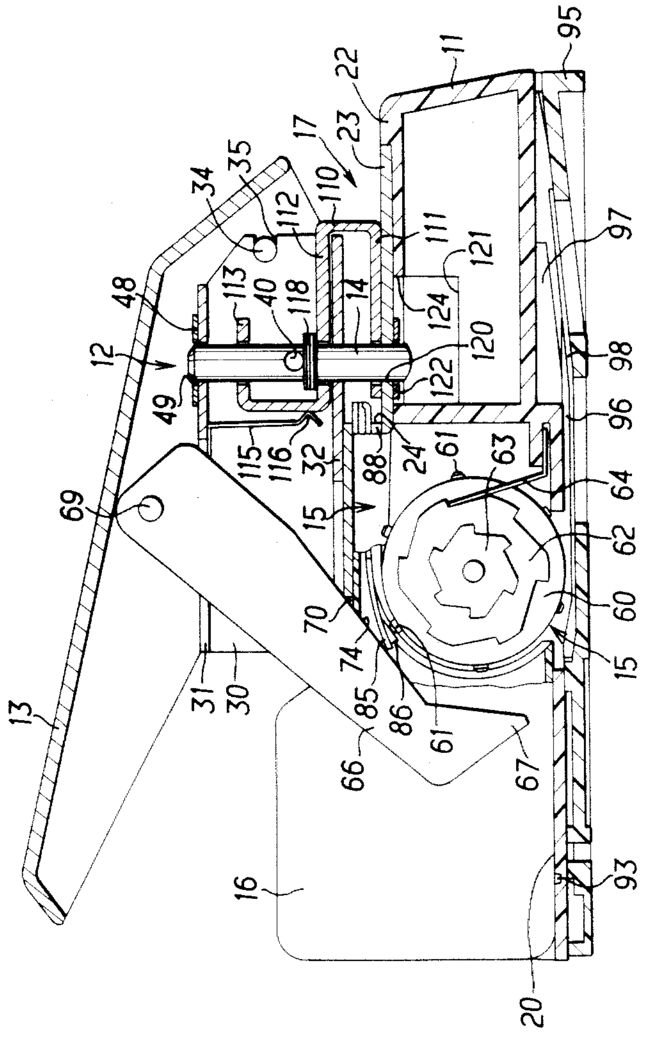
FIG. 7 is a cross-sectional side view of the same paper punch having completed a punching operation.

As is obvious from FIGS. 6 and 7, the small projection 86 on the resilient tongue 85 extending from the intermediate wall 82 of the cassette 16 is provided in such a position that the small projection 86 is constantly kept in contact with one of the small projections 61 on the tape-feed roller 60 while the handle 13 is in the raised position standing ready for the next reinforcing-piece sticking operation. Accordingly, by virtue of the resilience of the tongue 85, the small projection 86 retreats through the passage for the tape C provided between the intermediate wall 82 and engaging edges 83. As such, a small hole d in the carrying-tape C is at all times engaged with either one of the small projections 61 on the roller 60 or the small projection 86 on the resilient tongue 85 regardless of the condition of the cassette 16. When, for instance, the cassette 16 is loaded in position, small holes d in the carrying-tape C are engaged with small projections 61 on the roller 60. When, on the other hand, the cassette 16 is detached from the base 11, a small hole in the carrying-tape C comes in engagement with the small the projection 86 on the resilient tongue 85 that juts out into the passage of the tape C between the intermediate wall 82 and the engaging edges 83. Consequently, the carrying-tape C is constantly held in the desired condition in the beak-like outlet 80 of the cassette 16. The tip of the small projection 86 is raised on the forward side and lowered on the opposite side so that the carrying tape C is let out smoothly while being kept from receding back into the cassette 16.

The cassette 16 has a knife edge 90 to cut off the let-out carrying-tape C at the lower end of the side on which the beak-like outlet 80 is provided or, in other words, in the corner of the cassette 16 where the passage for the tape C between the intermediate wall 82 and the engaging edges 83 in the beak-like outlet 80 terminates. On the other hand, the carrying-tape C has small cuts 91 provided on both edges thereof at such intervals as will bring such cuts into the meeting position with the knife edge 90, thereby facilitating the cutting-off operation of the unnecessary carrying-tape C.

To put a cassette 16 into the base 11 from behind in such each manner as to face the roller 60, a recess 20 has a large enough width to accommodate a cassette 16. As previously stated, a recess 20 is provided on each side of the rear half of the base 11. The position of a cassette 16 inserted in the recess 20 in the base 11 is fixed when the tip of the engaging edges 83 of the beak-like outlet 80 thereof comes in contact with the vertical portion 24 of the metal sheet 23. To fasten the inserted cassette 16 to the base 11, the cassette 16 has a long projection 92 at the bottom thereof, while the base 11 has a corresponding groove 93 to engage with the long projection 92 at the bottom of the recess 20 therein.

When the handle 13 is depressed to turn the roller 60 through a given angle, one of the small projections 61 on the roller 60 pulls out a given length of the carrying-tape C from each cassette 16, whereupon one reinforcing-piece B is thrown onto paper A from each cassette 16. The used portion of the tape C pulled out from the cassette 16 is sent outside through a passage 96 between the base 11 and a bottom lid 95 of synthetic resin fitted in the bottom thereof.

Figure 10:
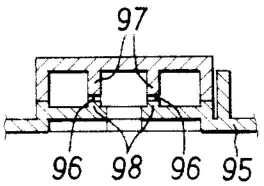
FIG. 10 is a partial cross section taken along the line X—X of FIG. 6.

If made of synthetic resin or other similar material, the used tape C discarded through the passage 96 may get statically electrified as a result of the friction produced between the outlet of the cassette 16, from which the tape C is drawn out by the rotation of the roller 60, and the passage 96. Consequently, the used tape C tends to adhere to the wall of the passage 96 under the influence of the static electricity on leaving the forcibly driven roller 60. However, guide rails 97 and 98 provided on the top and bototm walls of the passage 96, as shown in FIGS. 6, 7 and 10, reduce the adhering force built up through surface contact, thereby ensuring smooth discharge of the used tape.

Paper A placed on the base 11 sometimes may not require a reinforcing-piece B. On such occasions, a cassette 16 may be removed from the base to suspend the feed of reinforcing-piece B. The paper punch 10 is also equipped with a mechanism that enables such suspension without removing a cassette 16.

As shown in FIG. 9, a shallow recess 100 is provided on the base 11 under the middle portion of the rear edge of the metal sheet 23 laid thereon. A movable plate 102 adapted to slide through the recess 100 is fitted therein. The projecting end of the movable plate 102 is bent upward beyond the rear edge of the metal sheet 23 to form a knob 103. The movable plate 102 also has horizontal projections 104, 104 extending sideways. Each horizontal projection 104 protrudes into the groove 70 cut in the metal sheet 23 in the recess 20 that is provided on each side to contain a cassette 16 so that the tip thereof comes in contact with the ratchet lever 66.

When the reinforcing-piece B is not required, the knob 103 is pulled backward, whereupon the tip of the projection 104 comes in contact with the lower side of the lever 66 to cause the lever 66 to move from the deeper part of the groove 70 in the metal sheet 23 to the shallower part thereof. Consequently, the catch 67 at the tip of the ratchet lever 66 is disengaged from a tooth on the smaller ratchet 63. Even if the handle 13 is depressed, the lever 66 thus guided by the ratchet projection 104 does not rotate the smaller ratchet 63. When the knob 103 is pressed down to below the metal sheet 23, on the other hand, the projection 104 is kept out of contact with the lever 66, whereby the ratchet lever 66 is pushed into the deeper part of the groove 70 in the metal sheet 23 to bring the catch 67 at the tip thereof into engagement with a tooth on the smaller ratchet 63, which is thereby rotated.

In order to keep the movable plate 102 latched in the pulled-out position and the pushed-in position, a deeper groove 106 is provided in the shallow recess 100 directly under the movable plate 102 to hold a resilient sheet 108 having a projection 109 which is adapted to resiliently engage with either of two holes provided in the forward and rearward portions of the movable plate 102. When the movable plate 102 is moved forward or backward by the force applied on the knob 103, the projection 109 heretofore engaged with one of the two holes slips out therefrom against the force of the resilient sheet 108 to allow the movable plate 102 to travel forward or backward until the projection 109 engages with the other hole to latch the movable plate 102 in that position.

Even if reinforcing-pieces B are sent to onto paper A as described above, there is no guarantee that all of them are securely stuck thereon. Therefore, a pressing mechanism 17 is provided to firmly press an appropriately positioned reinforcing-piece B against paper A before a hole is punched therethrough by the punching rod 14 (see FIGS. 6 and 7).

The pressing mechanism 17 has a pressing element 110 made of a bent metal sheet. The pressing element 110 has a lower pressing segment 111 that is wider than the reinforcing-piece B to be pressed thereby. The lower pressing segment 111 is positioned above the sticking position of the reinforcing-piece B below the lower side 32 of the associated channel-shaped support 30. An intermediate segment 112, a horizontal extension of the lower segment 111 leading therefrom through a short upturned segment rounding around the front edge of the lower side 32, and an upper segment 113 formed by bending the tip of the intermediate segment 112 again into a U-shape are positioned between the upper side 31 the lower side 32 of the associated channel-shaped support 30. The lower, intermediate and upper segments 111, 112 and 113 of the pressing element 110 have holes through which the punching rod 14 is slidably passed. Therefore, the pressing element 110 can move up and down along the punching rod 14, whereby the lower segment 111 presses a reinforcing-piece B placed on paper A against the metal sheet 23 when the pressing element 110 is depressed.

To keep the lower pressing segment 111 of the pressing element 110 in the elevated position directly under the lower side 32 of the channel-shaped support 30, a downwardly extending plate spring 115 is attached to the upper side 31 of the channel-shaped support 30. A bent engaging tip 116 at the lower end of the plate spring 115 is brought into engagement with a bent portion between the intermediate segment 112 and upper segment 113 of the pressing element 110 to keep the pressing element 110 from descending when unnecessary. When the handle 13 is in the raised position, the pin 40 is positioned under the upper segment 113 to prevent the descent of the pressing element 110 while raising the punching rod 14 to the uppermost position.

The punching rod 14 carries a coil spring 118 wound therearound between the intermediate segment 112 of the pressing element 110 and the pin 40, with the elastic force of the spring 118 constantly exerted as a depressing force on the pressing element 110. However, the elastic force of the spring 118 is not so strong as to release the engagement with the plate spring 115 while the punching rod 14 is in the elevated position.

Accordingly, when the upper end of the handle 13 is depressed, the pin 40 compresses the coil spring 118. When the spring force becomes large enough, the pressing element 110 pushes aside the plate spring 115 against the force thereof and descends at a stroke to press a reinforcing-piece B against paper A.

While the smaller ratchet 63 of the reinforcing-piece sticking mechanism 15 turns forward one tooth length, the paper pressing element 110 should not be lowered to allow a reinforcing piece B to be stuck on paper A. To cause the pin 40, which is provided to lower the pressing element 110, to idle, therefore, the insertion hole 41 provided in the handle 13 to receive the pin 40 is arched as shown in FIG. 2. The following action is achieved by virtue of the arched insertion hole 41.

The spring 38 constantly keeping the handle 13 in the raised position brings the pin 40 in contact with the upper end of the slots 42, 43 in the channel-shaped support 30, thereby limiting the height of the raised handle 13. At the same time, the spring 38 brings the pin 40 in contact also with the lower end of the arched insertion hole 41 and keeps the pressing element 110 in the raised position.

In the early stage of the descent of the handle 13 in which the pressing element 110 moves slightly downward with the descending handle 13 under the influence of the force exerted thereon by the tension spring 54, the pin 40 moves downward only slightly together with the descending pressing element 110.

After this, the pin 40 does not descend until it comes in contact with the upper end of the arched insertion hole 41 in the handle 13. In the meantime, the handle 13 is lowered continuously, and a reinforcing-piece B is let out by the action of the ratchet lever 66.

After the pin 40 came in contact with the upper end of the arched insertion hole 41 in the handle 13, the descending pin 40 lowers the punching rod 14 and compresses the coil spring 118 provided thereunder against the pressing element 110. When the coil spring 118 has been compressed to a certain extent, the pressing element 110 disengages itself from the plate spring 115 to drop at a stroke, thereby pressing the paper A and the reinforcing piece B stuck thereon that are jointly placed there-under. Consequently, the punching rod 14 cuts a hole through the paper A, on which the reinforcing-piece B has been securely stuck, that is firmly held in position by the pressing element 110.

The metal sheet 23 has punching holes 120 into which the descending punching rods 14 fit to cut binding holes $A_1$, $A_2$. When the lower end of the punching rods 14 passes through the paper A into the punching holes 120 in the metal sheet 23, the holes $A_1$, $A_2$ are cut through the paper A and reinforcing-pieces B as shown in FIG. 10. Pieces of punched scrap are collected in a container 121 and discarded at appropriate intervals by removing the bottom lid 95. The diameter of the punching rod 14 and punching the holes 120 should of course be larger than the diameter of the small hole d preliminarily punched through the carrying-tape C and reinforcing pieces B.

The depressed handle 13 is immediately released, whereupon the handle 13 is instantly brought back to the highest original position by the action of the spring 38. When such a sharp return motion is made, the catch 67 of the ratchet lever 66 rubs against the smaller ratchet 63, exerting a force to cause a reversed rotation thereof. However, the plate spring 64 resiliently kept in contact with the larger ratchet 62 prevents such a reversed rotation, thereby keeping the feed of the carrying-tape C from the cassette 16 undisturbed.

The reinforcing-piece B is temporarily stuck on the carrying-tape C by means of an adhesive applied on one side thereof. The punching rod 14 cuts a hole through paper A after a reinforcing-piece B has been stuck thereon. Every time punching is carried out, the punching rod 14 may collect a small amount of the adhesive from each reinforcing-piece B. The adhesive clinging to the punching rod 14 increasingly hampers the passage thereof into a punching hole 120 provided in the metal sheet 23, thereby impeding the execution of a smooth punching operation.

This problem is solved by providing an annular oil-absorbing ring 122 of sponge or other similar material having a hole of a diameter substantially equal to that of the punching rod 14 on the under side of the punching hole 120 in the metal sheet 23. The oil-absorbing ring 122 is soaked with an oily agent to prevent the adhesive from clinging to the punching rod 14. A hole 124 is provided in the base 11 to permit the oil-absorbing ring 122 to be stuck to an appropriate position on the under side of the metal sheet 23. Also, the oil-absorbing ring 122 is placed in such a position as is visible from the under side of the base 11 when the bottom lid 95 is taken off for the removal of the punched scrap.

Such a punching rod cleaning mechanism applies an oily agent on the surface of the punching rod 14 every time the punching rod 14 passes through the punching hole 120 in the metal sheet 23. The oily agent thus applied effectively prevents the undesirable clinging of the adhesive onto the punching rod 14.

Figure 11:
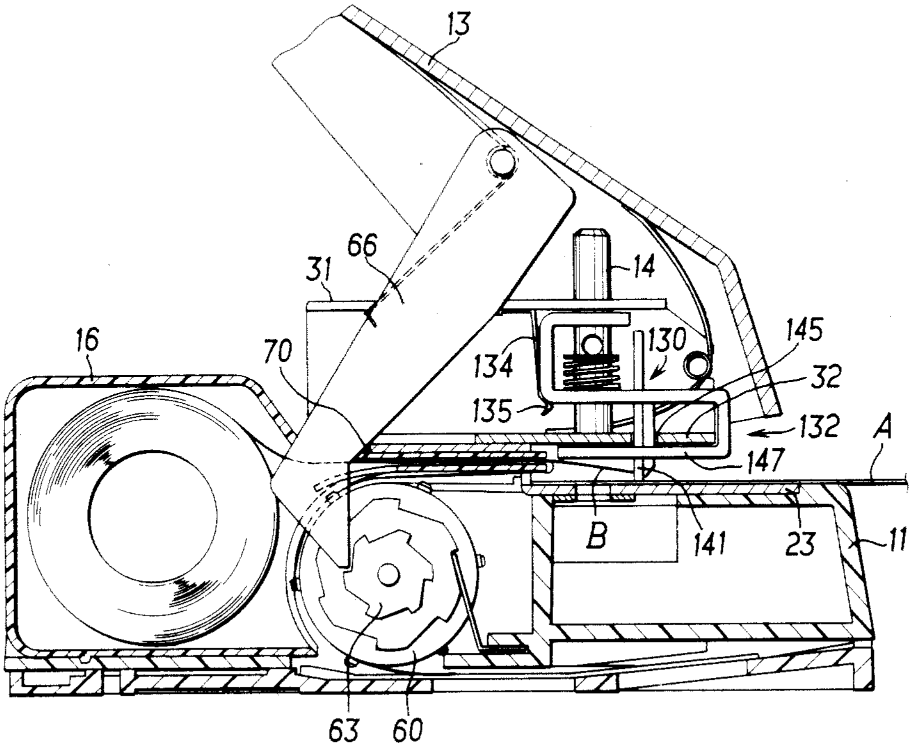
FIG. 11 is a cross-sectional side view of another paper punch equipped with a reinforcing-piece feed position controlling mechanism.
Figure 12:
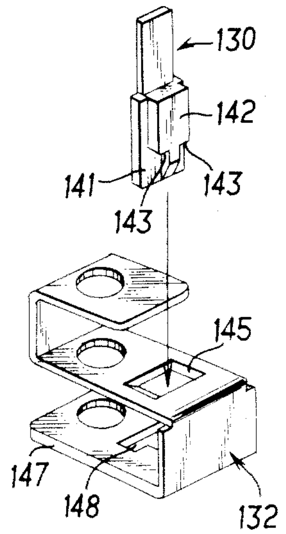
FIG. 12 is a perspective view showing the principal part of the second preferred embodiment.

The reinforcing-piece sticking operation is interlocked with the punching operation by the handle 13. However if the handle is depressed too vigorously, some of the refinforcing pieces B may jump over the desired sticking position on the paper to disturb the intervals at which such pieces are stuck thereon. To solve this problem, an elevatable stopper 130 is provided to limit the sticking position of a reinforcing-piece B as shown in FIGS. 11 and 12. The stopper 130 should preferably be lowered onto the base 11 in the early stage of the descending stroke of the handle 13.

A more detailed description of the stopper 130 is given hereunder. As in the first preferred embodiment described before, a plate spring 134 that engages with a pressing element 132 that is thereby kept in the raised position has a curved engaging portion 135 at the lower end thereof that is protruded under the intermediate portion of the pressing element 132. The curved engaging portion 135 engaging with the pressing element 132 is shaped so that the pressing element 132 is allowed to descend slightly when the handle 13 begins to descend to cause the punching rod 14 to move downward to some extent.

The reinforcing-piece stopper 130 has, as shown in FIG. 12, A lower portion 141 that is wider than the diameter of the punching rod and flattened in the direction perpendicular to the direction in which paper A is passed in and out on the base 11. Engaging portion 143, 143 are formed by a T-shaped relief 142 standing out from the surface of the lower portion 141, with the lower end of the T-shaped relief 142 being tapered downward to meet the lower end of the stopper 130.

The stopper 130 moves vertically to loosely pass through square holes 145, 145 made in the pressing element 132 and the lower side 32 of the associated channel-shaped support 30. When the engaging portions 143, 143 come in engagement with a T-shaped hole 148 provided in the pressing portion 147 at a lower end of the pressing element 132, the tip of the lower portion 141 and the T-shaped relief 142 protrudes toward the base 11 to limit the descent from the pressing element 132.

The stopper 130 incorporated in the pressing mechanism is positioned on the forward side of the punching rod 14 as shown in FIG. 11. Besides, the position of the stopper 130 is such that the punching rod 14 hits the center of a reinforcing-piece B that falls onto the metal sheet 23 on striking against the lower portion 141 thereof.

When the handle 13 is in the uppermost position, the stopper 130 is raised with the pressing element 132 as a result of the engagement of the engaging portions 143, 143 with the T-shaped hole 148. Therefore, paper A to be punched can be placed on the metal sheet 23 under the punching rod 14.

Then, the free end of the handle 13 is depressed to cut binding holes through the inserted paper A. In the early stage of the descending stroke, the pin 40 is freed by virture of the insertion hole 41 as described previously, whereupon the pressing element 132 tends to move downwardly. However the cured engaging portion 135 of the plate spring 134 allows no more than a slight descent. With this slight descent, the lower end of the stopper 130 falls with the pressing element 132 onto the paper A placed on the base 11.

As the handle 13 is further depressed, the ratchet lever 66 shoots out a reinforcing-piece B onto the paper A. Although the handle 13 is often depressed at a stroke, the vigorously shot out reinforcing-piece B is stopped by the lower portion 141 of the stopper 130 that has fallen into position in advance. Accordingly, the reinforcing-piece is always stuck in the desired position on the paper A.

Because the width of the stopper 130 is larger than the diameter of a hole made by the punching rod 14, the punched hole does not get caught by the stopper 130 when the paper A stuck with the reinforcing-piece B is taken out.

In the preferred embodiment shown in FIGS. 11 and 12, the paper pressing mechanism consisting essentially of the pressing element 110 is replaced with the stopper 130. However, it is also possible to provide the stopper 130 together with the paper pressing mechanism.

We claim:

1. A paper punch comprising:

(a) a base;

(b) a handle for moving up and down a punching rod engaged to said handle, said handle being rotatably mounted on said base by means of a spindle;

(c) a first mechanism to send out a carrying-tape carrying a large number of pieces to reinforce punched holes in a sheet of paper by the length of a single reinforcing-piece interlockingly with the motion of said handle;

(d) a second mechanism to place a reinforcing-piece in the desired position on the paper placed on said base, the reinforcing-piece being stuck to the paper by means of an adhesive coated on one side thereof;

(e) a third mechanism to punch a binding hole through the reinforcing-piece and the paper (f) means for preventing said punching rod from descending to perform a punching operation while the carying-tape is sent out by the length of one reinforcing-piece in the early stage of the descending stroke of said handle;

(g) a fourth mechanism to press the reinforcing-piece placed in the desired position on the paper thereagainst before a hole is punched therethrough by said punching rod;

(h) a recess provided in the rear portion of said base to accommodate a cassette containing the carrying-tape;

(i) a pair of supports having a spindle that rotatably supports said handle mounted in the front part of said base in such a manner as to leave a clearance to insert the paper between said base and said supports; and (j) a spring coiled around said spindle and resiliently interposed between said supports and said handle so that said handle is constantly urged toward the raised position.

2. A paper punch according to claim 1, and further comprising a punching rod cleaning mechanism provided to prevent an adhesive on the reinforcing-pieces from clinging to said punching rod.

3. A paper punch according to claim 1, in which:

(a) a hole is provided in a position somewhat away from the lower end of said handle so that a horizontal pin passed through said punching rod is loosely passed therethrough and (b) a vertical slot to guide the movement of said pin is provided in each one of said pair of supports.

4. A paper punch according to claim 3, in which:

(a) a vertically movable paper pressing element constantly spring-urged downwardly is provided to serve as a mechanism to press the paper to be perforated by said punching rod in a position where no reinforcing-piece is stuck;

(b) said pressing element has a vertical slot through which said pin is passed;

(c) said pressing element is raised from said base by means of said pin when said handle is raised and lowered by the force of said spring when said handle is depressed; and (d) said pin is not allowed to move further down in said vertical slot when the lower end of said pressing element reaches the paper.

5. A paper punch according to claim 1, in which:

(a) a tape-feed roller rotatable interlockingly with the descent of said handle is provided:

(b) said tape-feed roller has regularly spaced small projections provided around the periphery thereof;

(c) said small projections are adapted to engage with small holes punched at regular intervals in the carrying tape;

(d) said tape-feed roller is adapted to let out said carrying-tape from the cassette on being rotated; and (e) said tape-feed roller is disposed so that the carrying-tape let out from the cassette is sharply bent so that a reinforcing-piece spontaneously coming off from the carrying tape is placed on the desired position on the paper.

6. A paper punch according to claim 5, in which:

(a) two ratchets are provided on one side of said tape-feed roller;

(b) a plate spring engages the teeth on one of said two ratchets to prevent reverse rotation thereof;

(c) a catch at the tip of a ratchet lever engages the teeth on the other one of said two ratchets, the upper end of said ratchet lever being rotatably connected to said handle so that said other one of said two ratchets is rotated when said handle is depressed; and (d) the teeth on said two ratchets are spaced apart from each other at such intervals that the center angle formed between each two adjoining teeth is equal to that between each two adjoining small projections around the periphery of said tape-feed roller.

7. A paper punch according to claim 6, in which:

(a) said ratchet lever has an intermediate portion;

(b) said intermediate portion of said ratchet lever is fitted in a groove provided in said base and constantly spring-urged toward the inside of said groove when said ratchet lever comes in engagement with said other one of said two ratchets; and (c) said ratchet lever is adapted to disengage itself from said other one of said two ratchets on coming in engagement with a portion of said base after said other one of said two ratchets has been rotated through a given angle by said ratchet lever.

8. A paper punch according to claim 7, in which:

(a) a movable plate to keep said tip of said ratchet lever away from said other one of said two ratchets is retractably provided in said base and (b) said movable plate is adapted to switch on an off the feed of the reinforcing-pieces.

9. A paper punch according to claim 5, in which:

(a) said paper punch further comprises a cassette for the carrying-tape;

(b) said cassette has a beak-liek outlet to let out the carrying-tape from within;

(c) said beak-like outlet has a clearance through which the carrying-tape is guided to the tip of said beak-liek outlet and another clearance through which the carrying-tape is passed backward; and (d) said tip of said beak-like outlet is positioned so that a reinforcing-piece discharged from said beak-like outlet is placed in the desired position on the paper.

10. A paper punch according to claim 9, in which:

(a) a tape-feed roller is disposed along the clearance through which the carrying-tape is padded backwardly so that the carrying-tape taken out from said cassette is wound around the surface of said tape-feed roller and (b) a resilient tongue that resiliently comes in contact with said tape-feed roller is provided in said beak-like outlet, said resilient tongue having a small projection adapted to come in engagement with small holes punched in the carrying-tape.

11. A paper punch according to claim 3, in which:

(a) said fourth mechanism comprises a pressing element made of a bent metal sheet;

(b) said pressing element has a lower side that is positioned above the point at which a reinforcing-piece is stuck to the paper;

(c) said pressing element has a hole through which said punching rod is slidably passed;

(d) said pressing element is engaged with a plate spring that constantly biases said pressing element toward a raised position; and (e) a spring exerting a depressing force on said pressing element is interposed between said pressing element and said punching rod.

12. A paper punch according to claim 3, and further comprising latching means to keep said punching rod from descending while the carrying-tape is let out by the length of a single reinforcing-piece in the early stage of the descending stroke of said handle, said latching means comprising an insertion hole in said handle through which said pin is passed, said insertion hole being a slot that is arched so that said pin is not engaged with said handle while the carrying-tape is let out by the length of a single reinforcing-piece.

13. A paper punch according to claim 2, in which:

(a) said punching rod cleaning mechanism comprises an oil-absorbing ring having a through hole of a diameter substantially equal to the diameter of said punching rod and (b) said oil-absorbing ring is attached to the under side of a hole in said base through which said punching rod passes and is soaked with an oily agent to prevent the clinging of an adhesive onto said punching rod.

* * * * *